United States Patent
Fan et al.

(10) Patent No.: US 10,179,327 B2
(45) Date of Patent: Jan. 15, 2019

(54) MESOPOROUS TERNARY COMPOSITE MATERIAL AND CORRESPONDING METHOD OF PREPARATION

(71) Applicant: Tongji University, Shanghai (CN)

(72) Inventors: Jianwei Fan, Shanghai (CN); Hongyang Min, Shanghai (CN); Xu Jiang, Shanghai (CN); Dandan Li, Shanghai (CN); Wangyuan Chen, Shanghai (CN); Minjun Chen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 309 days.

(21) Appl. No.: 15/176,417

(22) Filed: Jun. 8, 2016

(65) Prior Publication Data

US 2016/0279617 A1    Sep. 29, 2016

Related U.S. Application Data

(63) Continuation of application No. PCT/CN2014/088180, filed on Oct. 9, 2014.

(30) Foreign Application Priority Data

Mar. 27, 2014    (CN) .......................... 2014 1 0120343

(51) Int. Cl.

| | |
|---|---|
| *B01J 23/889* | (2006.01) |
| *B01J 23/00* | (2006.01) |
| *B01J 29/03* | (2006.01) |
| *B01J 35/02* | (2006.01) |
| *B01J 35/10* | (2006.01) |
| *B01J 37/02* | (2006.01) |
| *B01J 37/03* | (2006.01) |
| *B01J 37/04* | (2006.01) |
| *B01J 37/08* | (2006.01) |
| *B01J 37/10* | (2006.01) |

(52) U.S. Cl.
CPC ......... *B01J 23/8892* (2013.01); *B01J 23/002* (2013.01); *B01J 29/0341* (2013.01); *B01J 35/023* (2013.01); *B01J 35/026* (2013.01); *B01J 35/1019* (2013.01); *B01J 35/1038* (2013.01); *B01J 35/1042* (2013.01); *B01J 35/1047* (2013.01); *B01J 35/1061* (2013.01); *B01J 37/0236* (2013.01); *B01J 37/031* (2013.01); *B01J 37/04* (2013.01); *B01J 37/08* (2013.01); *B01J 37/10* (2013.01); *B01J 2523/00* (2013.01)

(58) Field of Classification Search
CPC .. B01J 23/8892; B01J 23/002; B01J 29/0341; B01J 37/0236; B01J 37/031; B01J 37/08
See application file for complete search history.

(56) References Cited

U.S. PATENT DOCUMENTS 5,795,555 A    8/1998    Alive et al.

FOREIGN PATENT DOCUMENTS

| CN | 103058274 A | * | 4/2013 |
|---|---|---|---|
| CN | 103084166 A | | 5/2013 |

OTHER PUBLICATIONS

Innocenzi, Plinio, and Galo Soler Illia. "Mesoporous Thin Films: An Example of Pore Engineered Material." Key Engineering Materials. vol. 391. Trans Tech Publications, 2009. (Year: 2009).*
Oveisi, Hamid, et al. "Synthesis of Continuous Mesoporous Ga-Doped Titania Films with Anatase Crystallized Framework." Journal of nanoscience and nanotechnology 11.8 (2011): 6926-6933. (Year: 2011).*
Machine translation of CN 103058274 A. (Published Apr. 24, 2013); conducted on ProQuest Dialog, Aug. 30, 2018. (Year: 2013).*
International Search Report in counterpart International Application No. PCT/CN2014/088180, dated Jan. 14, 2015.
Fan J. et al., "Nanoparticle Assembly of Ordered Multicomponent Mesostructured Metal Oxides via a Versatile Sol-Gel 3rocess", Chemistry of Materials 2006 18 (26), 6391-6396 (abstract).

* cited by examiner

*Primary Examiner* — Nicholas E Hill
(74) *Attorney, Agent, or Firm* — Edell, Shapiro & Finnan, LLC

(57) ABSTRACT

Mesoporous ternary composite materials and a corresponding preparation method are described herein. The method includes the following steps: (1) adding hydrochloric acid and acetic acid into an ethanol solution to prepare a dissolving system; (2) adding a surfactant into the dissolving system and fully stirring for dissolution; (3) adding copper nitrate, manganese nitrate solution and tetrabutyl titanate into the mixed liquid obtained from step (2) and evenly stirring; (4) transferring the mixture obtained from step (3) into petri dishes and obtaining transparent films after drying; and (5) calcinating the transparent films to obtain mesoporous ternary composite materials. The materials prepared are ordered mesoporous materials with high specific surface areas and high dispersion degree of every component.

7 Claims, No Drawings

MESOPOROUS TERNARY COMPOSITE MATERIAL AND CORRESPONDING METHOD OF PREPARATION

TECHNICAL FIELD

The present invention belongs to the field of material preparation and relates to mesoporous ternary composite materials and a method thereof.

BACKGROUND OF THE INVENTION

Mesoporous material has a pore size distribution of 2 to 50 nm and is a porous material between microporous material and macroporous material. The pore size distribution of the mesoporous material makes itself remain high specific surface areas and at the same time offers large adsorption and reaction space for bulky molecules and also remains good structural stability. Therefore, mesoporous materials, such as mesoporous silicon, mesoporous carbon and mesoporous metal oxide materials, have been widely studied in recent years.

Metal oxides that usually function as catalysts' active components are loaded onto carriers with high specific surface areas to prepare the catalysts. The simplest preparation method is impregnation method, which briefly speaking refers to that mixing the prepared carriers with metallic saline solution so that metal elements absorb on surfaces or pore channels of the carriers, after filtration, drying, calcination and other steps, the materials having catalytic activities are finally obtained. However, the method has many deficiencies: the active components, namely the metal oxides, have bad dispersibility on surfaces of carriers, which leads to such phenomenon as agglomeration and thus decreases the number of the active sites; during the process of the use of materials, the metal oxides that are on the surfaces of the carriers are very likely to become detached, resulting in the loss of the active components. In addition, there are some other preparation methods such as sol-gel method, gas phase precipitation method, ion exchange method, co-precipitation method and so on. However, these methods, since some of them have complicated preparation processes and some others have low loading capacities, can be improved. Therefore, it is of great significance to study on mesoporous composite metal oxide materials with simple preparation processes, high specific surface area, good dispersibility and high loading capacities of the active components and high stability.

SUMMARY OF THE INVENTION

The present invention aims to overcome the defects of current preparation methods for synthesizing metal oxide materials and then provides mesoporous ternary composite materials and a preparation method thereof.

To achieve the above aim, the present invention adopts the following technical schemes.

A method for preparing mesoporous ternary composite materials comprises the following steps:
adding hydrochloric acid and acetic acid into an ethanol solution to prepare a dissolving system;
adding a surfactant into the dissolving system and fully stirring for dissolution;
adding copper nitrate, manganese nitrate solution and tetrabutyl titanate into the mixed liquid obtained from step (2) and evenly stirring;
transferring the mixture obtained from step (3) into petri dishes and obtaining transparent films after drying; and
calcinating the transparent films to obtain mesoporous ternary composite materials.

In the step (1), the concentrations of the hydrochloric acid and the acetic acid in the dissolving system are 30 to 50 g/L and 60 to 100 g/L, respectively.

In the step (2), the surfactant is F127 or P123; F127 is a triblock copolymer (polyoxyethylene-polyoxypropylene-polyoxyethylene), the molecular formula of which is $EO_{106}PO_{70}EO_{106}$; wherein, the mass ratio of F127 to ethanol is 1:10 to 1:20; and the mass ratio of P123 and ethanol is 1:10 to 1:20.

In the step (3), the copper nitrate, the manganese nitrate solution and the tetrabutyl titanate are added at element mole ratio of Cu:Mn:Ti=(1-5):(1-5):(40-48), wherein the mass ratio of the tetrabutyl titanate to F127 is 1:1 to 3:1; and then vigorously stirring at the temperature of 40° C. for 1 to 3 h with the rotating speed at 300 to 500 r/min. The mass ratio of the tetrabutyl titanate to P123 is 1:1 to 3:1.

In the step (4), the mixture is placed under conditions at a temperature of 40° C. and a relative humidity of 40 to 60% and stands for 12 to 24 h for volatilization.

In the step (5), calcinating is conducted at 350 to 550° C. for 5 h.

Mesoporous ternary composite materials are prepared by the above methods.

The physical parameters of the mesoporous ternary composite materials are: the particle size is 5 to 8 mm, the specific surface area is greater than 150 $m^2/g$, the pore volume is greater than 0.3 mL/g; the mesoporous ternary composite materials comprise 2 to 10% of CuO, 2 to 10% of $MnO_x$ and 80 to 96% of $TiO_2$ in molar ratio, wherein the $MnO_x$ is $MnO_2$ and $Mn_2O_3$.

The present invention has the following advantageous effects.

The present invention provides a method for preparing mesoporous ternary composite materials. The mesoporous ternary composite material prepared by the above method exhibits the characteristics of large specific surface area, high degree of order of pores, high active components contents, good dispersibility of each component and high stability, etc. The three metal oxides are evenly combined together through a simple one-pot method to form the mesoporous structure. In this way, active components such as Cu and Mn are embedded into the framework of the mesoporous materials and are able to exist stably and don't migrate out of it or become agglomerated when being applied. The overall mesostructure of the material is beneficial to the free diffusion of the reactant molecules, thus improving the catalytic activities of the obtained materials when being applied in chemical reaction.

DETAILED DESCRIPTION OF THE INVENTION

Further illustration of the present invention is made in connection with the following examples.

EXAMPLE 1

Adding appropriate amount of hydrochloric acid and acetic acid into an ethanol solution to prepare a dissolving system; wherein the concentrations of the hydrochloric acid and the acetic acid are 50 g/L and 100 g/L, respectively.

Adding a surfactant F127 into the dissolving system and fully stirring for dissolution; wherein, the mass ratio of F127 to ethanol is 1:20. (3), adding copper nitrate, manganese nitrate solution and tetrabutyl titanate at element mole ratio of Cu:Mn:Ti=1:1:48 into the mixed liquid obtained from step (2), wherein the mass ratio of the tetrabutyl titanate to F127 is 3:1, and then vigorously stirring at the temperature of 40° C. for 1 h with the rotating speed at 500 r/min.

Transferring the mixture obtained from step (3) into petri dishes, placing it under conditions at a temperature of 40° C. and a relative humidity of 40% and letting it stand for 12 h for volatilization and then drying at a temperature of 65° C. for 24 h.

Calcinating the acquired transparent films at 350° C. for 5 h to obtain the mesoporous ternary composite materials.

The mesoporous ternary composite materials have particle sizes at 5 to 8 mm, the specific surface area is equal to 300 $m^2/g$, pore volume is greater than 0.3 mL/g; the mesoporous ternary composite materials comprise 2% of CuO, 2% of $MnO_x$ and 96% of $TiO_2$ in molar ratio, wherein the $MnO_x$ is $MnO_2$ and $Mn_2O_3$.

EXAMPLE 2

Adding appropriate amount of hydrochloric acid and acetic acid into an ethanol solution to prepare a dissolving system; wherein the concentrations of the hydrochloric acid and the acetic acid are 30 g/L and 60 g/L, respectively.

Adding appropriate amount of the surfactant F127 into the dissolving system and fully stirring for dissolution; wherein, the mass ratio of F127 to ethanol is 1:10.

Adding copper nitrate, manganese nitrate solution and tetrabutyl titanate at element mole ratio of Cu:Mn:Ti=5:5:40 into the mixed liquid obtained from step (2), wherein the mass ratio of the tetrabutyl titanate to F127 is 1:1 and then vigorously stirring at the temperature of 40° C. for 3 h with the rotating speed at 300 r/min.

Transferring the mixture obtained from step (3) into petri dishes, placing it under conditions at a temperature of 40° C. and a relative humidity of 60% and letting it stand for 24 h for volatilization and then drying at a temperature of 65° C. for 48 h.

Calcinating the acquired transparent films at 450° C. for 5 h to obtain the mesoporous ternary composite materials.

The mesoporous ternary composite materials have particle sizes at 5 to 8 mm, the specific surface area is equal to 200 $m^2/g$, pore volume is greater than 0.3 mL/g; the mesoporous ternary composite materials comprise 10% of CuO, 10% of $MnO_x$ and 80% of $TiO_2$ in molar ratio, wherein the $MnO_x$ is $MnO_2$ and $Mn_2O_3$.

EXAMPLE 3

Adding appropriate amount of hydrochloric acid and acetic acid into an ethanol solution to prepare a dissolving system; wherein the concentrations of the hydrochloric acid and the acetic acid are 40 g/L and 80 g/L, respectively.

Adding appropriate amount of the surfactant F127 into the dissolving system and fully stirring for dissolution; wherein, the mass ratio of F127 to ethanol is 1:15.

Adding copper nitrate, manganese nitrate solution and tetrabutyl titanate at element mole ratio of Cu:Mn:Ti=5:5:90 into the mixed liquid obtained from step (2), wherein the mass ratio of the tetrabutyl titanate to F127 is 2:1 and then vigorously stirring at the temperature of 40° C. for 2 h with the rotating speed at 400 r/min.

Transferring the mixture obtained from step (3) into petri dishes, placing it under conditions at a temperature of 40° C. and a relative humidity of 50% and letting it stand for 24 h for volatilization and then drying at a temperature of 65° C. for 48 h.

Calcinating the acquired transparent films at 550° C. for 5 h to obtain the mesoporous ternary composite materials.

The mesoporous ternary composite materials have particle sizes at 5 to 8 mm, the specific surface area is equal to 260 $m^2/g$, pore volume is greater than 0.3 mL/g; the mesoporous ternary composite materials comprise 5% of CuO, 5% of $MnO_x$ and 90% of $TiO_2$ in molar ratio, wherein the $MnO_x$ is $MnO_2$ and $Mn_2O_3$.

The above descriptions of examples are conducive for ordinary technicians of the present technical field to understand and exploit the invention. It is obvious that persons skilled in the art of the present field can easily make various amendments to the above examples and apply the general principle illustrated in here into other examples without the effort of inventive work. Therefore, the present invention is not confined to examples herein. Any improvements and modifications conducted by persons skilled in the art of the present field according to the instructions of the present invention and without going beyond the scope of the present invention shall be included in the extent of protection of the present invention.

What is claimed:

1. A method for preparing mesoporous ternary composite materials, comprising the following steps:
    (a) adding hydrochloric acid and acetic acid into an ethanol solution to prepare a dissolving system;
    (b) adding a surfactant into the dissolving system and fully stirring for dissolution;
    (c) adding copper nitrate, manganese nitrate solution and tetrabutyl titanate into the mixed liquid obtained from step (b) and evenly stirring;
    (d) transferring the mixture obtained from step (c) into petri dishes and obtaining transparent films after drying; and
    (e) calcinating the transparent films to obtain mesoporous ternary composite materials.

2. The method according to claim 1, wherein in the step (a) the concentrations of the hydrochloric acid and the acetic acid in the dissolving system are 30 to 50 g/L and 60 to 100 g/L, respectively.

3. The method according to claim 1, wherein in the step (b), the surfactant comprises a polyoxyethylene-polyoxypropylene-polyoxyethylene triblock copolymer, and the mass ratio of surfactant to ethanol is 1:10 to 1:20.

4. The method according to claim 3, wherein in the step (c), the copper nitrate, the manganese nitrate solution and the tetrabutyl titanate are added at element mole ratio of Cu:Mn:Ti =(1-5):(1-5):(40-48) and then vigorously stirring at the temperature of 40° C. for 1 to 3 h with the rotating speed at 300 to 500 r/min; wherein, the mass ratio of the tetrabutyl titanate to surfactant is 1:1 to 3:1.

5. The method according to claim 1, wherein in the step (d), the mixture is placed under conditions at a temperature of 40° C. and a relative humidity of 40 to 60%, and stands for 12 to 24 h for volatilization.

6. The method according to claim 1, wherein in the step (e), calcinating is conducted at 350 to 350° C. for 5 h.

7. The method of claim 1, wherein the surfactant comprises a polyoxyethylene-polyoxypropylene-polyoxyethylene triblock copolymer having the molecular formula (ethylene oxide)$_{106}$(propylene oxide)$_{70}$(ethylene oxide)$_{106}$.

* * * * *